(12) United States Patent
Mori

(10) Patent No.: US 8,424,196 B2
(45) Date of Patent: Apr. 23, 2013

(54) SLEEVE INSERTING APPARATUS

(75) Inventor: Takafumi Mori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 347 days.

(21) Appl. No.: 12/736,769

(22) PCT Filed: Apr. 3, 2009

(86) PCT No.: PCT/JP2009/057307
§ 371 (c)(1),
(2), (4) Date: Nov. 8, 2010

(87) PCT Pub. No.: WO2009/136531
PCT Pub. Date: Nov. 12, 2009

(65) Prior Publication Data
US 2011/0056070 A1    Mar. 10, 2011

(30) Foreign Application Priority Data

May 9, 2008 (JP) .................................. 2008-123595

(51) Int. Cl.
*B23P 19/00* (2006.01)
(52) U.S. Cl.
USPC ............. 29/745; 29/282; 29/564.4; 29/566.1; 140/71 R; 140/107; 140/111
(58) Field of Classification Search .................... 29/745, 29/282, 426.4, 564.4, 564.6, 566.1, 728, 29/828, 869; 140/71 R, 107, 111
See application file for complete search history.

(56) References Cited

U.S. PATENT DOCUMENTS

| | | | | |
|---|---|---|---|---|
| 4,719,697 A | * | 1/1988 | Schwartzman et al. | 29/867 |
| 6,363,604 B1 | * | 4/2002 | Sakuma | 29/566.1 |

FOREIGN PATENT DOCUMENTS

| | | |
|---|---|---|
| JP | 52-124186 A | 10/1977 |
| JP | 2000-102133 A | 4/2000 |
| JP | 2000-350326 A | 12/2000 |
| JP | 2001-307853 A | 11/2001 |
| JP | 2001-357960 A | 12/2001 |
| JP | 2002-262427 A | 9/2002 |
| JP | 2003-032827 A | 1/2003 |
| JP | 2003-297493 A | 10/2003 |
| JP | 2005-229770 A | 8/2005 |

OTHER PUBLICATIONS

International Search Report and Written Opinion of the International Searching Authority dated May 19, 2009, issued for PCT/JP2009/057307.

* cited by examiner

*Primary Examiner* — Thiem Phan
(74) *Attorney, Agent, or Firm* — Edwards Wildman Palmer LLP

(57) ABSTRACT

A sleeve inserting apparatus, which can securely insert a sleeve into the inside of a braid of a coaxial cable, is provided. The sleeve inserting apparatus 1, includes: a base 22; a cable holding part 23 holding an end part 2a of a coaxial cable 2, the cable holding part 23 being provided on the base 22; a braid spreading part 24 spreading a braid 3 exposed from the end part 2a; a sleeve receiving cylinder 27 receiving a sleeve 4 inside, an end part of the sleeve receiving cylinder 27 facing the end part 2a being formed tapered; a cylinder transferring part 26 making the sleeve receiving cylinder 27 and the end part of 2a the coaxial cable 2 approach each other; and a sleeve pushing part 28 pushing the sleeve 4 situated in the sleeve receiving cylinder 27 to the inside of the braid 3.

20 Claims, 10 Drawing Sheets

SLEEVE INSERTING APPARATUS

TECHNICAL FIELD

The present invention relates to a sleeve inserting apparatus which inserts a cylindrical sleeve made of metal into the inside of a braid of a coaxial cable.

BACKGROUND ART

An antenna transmitting a high frequency oscillation is connected to a coaxial cable which blocks an influence of electric noise such as an electromagnetic wave or static electricity. Such a coaxial cable includes: a core wire made of metal; an electrically insulating inner coating which coats the core wire; a braid which is constructed by braiding a plurality is of metal wires and coats the inner coating; and an electrically insulating outer coating which coats the braid.

An end part of the coaxial cable attaches a terminal fitting (for example, see Japanese Patent Application Laid-Open No. 2003-297493) and the terminal fitting is connected to the antenna described above. Such a terminal fitting includes: an inner terminal which is made of electrically conductive sheet metal and connected to the core wire; an outer terminal which is made of electrically conductive sheet metal and caulks the braid so as to be connected to the braid; and an insulating member which is made of electrically insulating synthetic resin and electrically insulates the inner terminal and the outer terminal from each other.

DISCLOSURE OF THE INVENTION

Problems that the Invention is to Solve

As for the conventional terminal fitting, the outer terminal caulks the braid so as to be electrically connected to the braid. The inner coating, which is made of synthetic resin and has resilience, is positioned inside the braid. Therefore, even if the outer terminal caulks the braid, the inner coating is resiliently deformed, resulting in a possible problem that the outer terminal fails to come in close contact with the braid. Accordingly, it has been proposed that a hardly deformable cylindrical sleeve made of metal is inserted into the inside of the braid so that the braid is put between the outer terminal and the sleeve, thereby permitting the outer terminal to come in close contact with the braid.

However, since the braid is constructed by braiding a plurality of metal wires as described above, therefore the braid is easily deformed and accordingly, it is difficult to insert the sleeve into the inside of the braid.

It is therefore an objective of the present invention to solve the above problem and to provide a sleeve inserting apparatus which can securely insert the sleeve into the inside of the braid of the coaxial cable.

Means of Solving the Problems

In order to attain the above objective, the present invention is to provide a sleeve inserting apparatus, which inserts a cylindrical sleeve into the inside of a braid of a coaxial cable, including:

an apparatus body;

a cable holding part holding an end part of the coaxial cable, the cable holding part being provided on the apparatus body;

a braid spreading part spreading the braid exposed from the end part of the coaxial cable;

a sleeve receiving cylinder receiving the sleeve inside, an end part of the sleeve receiving cylinder facing the end part of the coaxial cable being formed tapered;

a cylinder transferring part making the sleeve receiving cylinder and the end part of the coaxial cable approach each other; and a sleeve pushing part pushing the sleeve situated in the sleeve receiving cylinder to the inside of the braid.

With the construction described above, the sleeve inserting apparatus has: the cable holding part holding an end part of the coaxial cable, the cable holding part being provided on the apparatus body; the braid spreading part spreading the braid; and the cylinder transferring part making the tapered sleeve receiving cylinder receiving the sleeve approach the end part of the coaxial cable. Therefore, by inserting the tapered sleeve receiving cylinder into the braid spread by the braid spreading part, the braid spread by the braid spreading part can be further spread. Since the sleeve inserting apparatus has the sleeve pushing part pushing the sleeve situated in the sleeve receiving cylinder to the inside of the braid, therefore the sleeves can be securely inserted into the braid, which is spread by the braid spreading part and the end part of the sleeve receiving cylinder.

The braid spreading part includes a braid hitting member hitting the braid exposed from the end part of the coaxial cable.

With the construction described above, the braid spreading part has the braid hitting member which hits the braid. When the braid hitting member hits the braid, an end part of the braid is spread toward the outer circumferential side.

The sleeve inserting apparatus further includes a braid hitting member transferring part transferring the braid hitting member along a longitudinal direction of the coaxial cable so that the braid hitting member hits a portion of the braid near a central part of the coaxial cable after the braid hitting member hits an end part of the braid exposed from the end part of the coaxial cable.

With the construction described above, the braid hitting member hits the braid in turn from the end part of the braid toward a portion of the braid situated at the central part of the coaxial cable. Therefore, whenever the braid hitting member hits the braid in turn from the end part of the braid toward a portion of the braid situated at the central part of the coaxial cable, the end part of the braid spread toward the outer circumferential side is further spread toward the outer circumferential side.

A cross section of the end part of the sleeve receiving cylinder is formed protrusively bent in an outer circumferential direction.

With the construction described above, since the cross section of the end part of the sleeve receiving cylinder is formed protrusively bent in the outer circumferential direction, therefore when the end part of the sleeve receiving cylinder is allowed to approach the end part of the braid, the end part of the braid is guided by the end part of the sleeve receiving cylinder, so that the braid is securely spread toward the outside.

The sleeve inserting apparatus further includes a braid pressing part pressing the braid, which is once spread by the braid spreading part and into the inside of which the sleeve is inserted by the sleeve pushing part, onto an outer circumferential surface of the sleeve.

With the construction described above, since the sleeve inserting apparatus further includes the braid pressing part pressing the braid, into the inside of which the sleeve is inserted, onto the outer circumferential surface of the sleeve, therefore when a terminal or the like is attached to the braid, a caulking piece of the terminal can securely put the braid between the caulking piece and the sleeve.

The sleeve receiving cylinder is provided with a through hole through which the sleeve is supplied, the through hole being provided at a position situated away from an end part of the sleeve receiving cylinder near the end part of the coaxial cable.

With the construction described above, since the sleeve is supplied into the sleeve receiving cylinder through the through hole, which is provided at a position situated away from the end part of the sleeve receiving cylinder, therefore the sleeve received in the sleeve receiving cylinder is positioned in the depth compared to the end part of the sleeve receiving cylinder.

Effects of the Invention

According to the present invention, by inserting the tapered sleeve receiving cylinder into the braid spread by the braid spreading part, the braid spread by the braid spreading part can be further spread and the sleeve can be securely inserted into the braid, which is spread by the braid spreading part and the end part of the sleeve receiving cylinder. Accordingly, the sleeve can be securely inserted into the inside of the braid of the coaxial cable.

According to the present invention, when the braid hitting member of the braid spreading part hits the braid, the end part of the braid is spread toward the outer circumferential side. Therefore, the sleeve can be securely inserted into the inside of the braid.

According to the present invention, since whenever the braid hitting member hits the braid in turn from the end part of the braid toward the portion of the braid situated at the central part of the coaxial cable, the end part of the braid spread toward the outer circumferential side is further spread toward the outer circumferential side, therefore the sleeve can be further securely inserted into the inside of the braid.

According to the present invention, since the cross section of the is end part of the sleeve receiving cylinder is formed protrusively bent in the outer circumferential direction, therefore when the end part of the sleeve receiving cylinder is allowed to approach the end part of the braid, the braid is securely spread toward the outside. Accordingly, the sleeve can be further securely inserted into the inside of the braid.

According to the present invention, since the caulking piece of the terminal can securely put the braid between the caulking piece and the sleeve, therefore the braid and the terminal can be securely electrically connected to each other.

According to the present invention, since the sleeve received in the sleeve receiving cylinder is positioned in the depth than at the end part of the sleeve receiving cylinder, therefore when the sleeve receiving cylinder is pressed onto the end part of the coaxial cable, the sleeve can be prevented from interfering with the core wire of the coaxial cable. Accordingly, the sleeve can be inserted into the inside of the braid of the coaxial cable without damaging the core wire of the coaxial cable.

Figure 1:
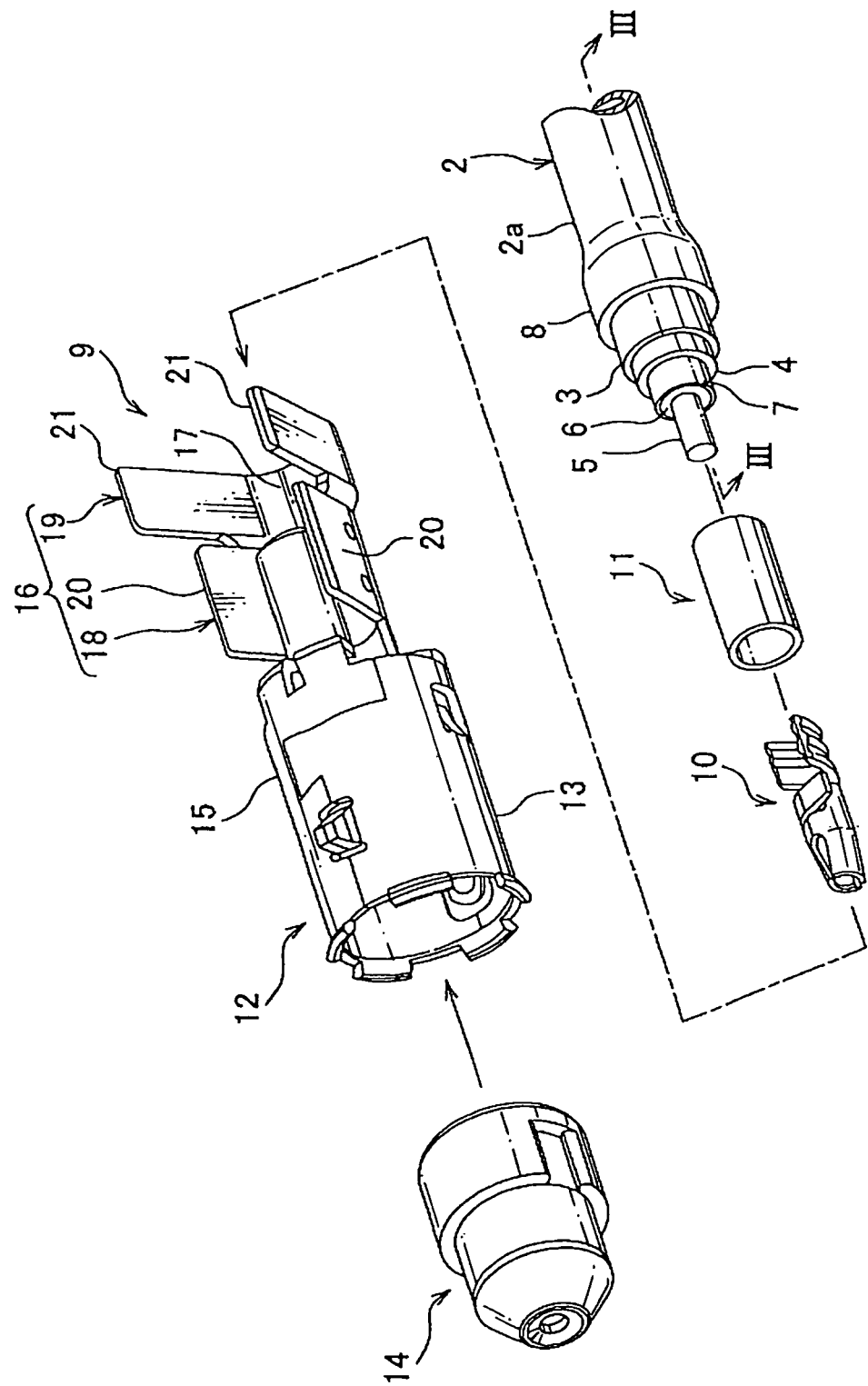
FIG. 1 A perspective view illustrating a coaxial cable into which a sleeve is inserted by a sleeve inserting apparatus according to a preferred embodiment of the present invention and a terminal fitting to be attached to the coaxial cable FIG. 2 A view illustrating a construction of a sleeve inserting apparatus which inserts a sleeve into the inside of a braid of the coaxial cable shown in FIG. 1

ABBREVIATION NUMERALS 1 sleeve inserting apparatus
2 coaxial cable
2a end part
3 braid
4 sleeve
22 base (apparatus body)
23 cable holding part
24 braid spreading part
25 braid pressing part
26 cylinder transferring part
28 sleeve pushing part
33 retractable approaching-leaving cylinder (braid hitting member transferring part)
34 braid hitting member
52 through hole

BEST MODE FOR CARRYING OUT THE INVENTION

In the following, a preferred embodiment of the present invention will be explained with reference to FIGS. 1-12. As shown in FIG. 1, a sleeve inserting apparatus 1 according to the preferred embodiment of the present invention inserts a sleeve 4, which is made of electrically conductive metal and formed in a cylindrical shape, into the inside of a braid 3 at an end part 2a of a coaxial cable 2.

As shown in FIG. 1, the coaxial cable 2 includes: a core wire 5; an inner coating 6 which coats the core wire 5; a metal foil 7 which coats the inner coating 6; a braid 3 as an outer conductor, which coats the metal foil 7, that is, coats the inner coating 6; and an electrically insulating sheath 8 as an outer coating, which coats the braid 3.

Figure 3:
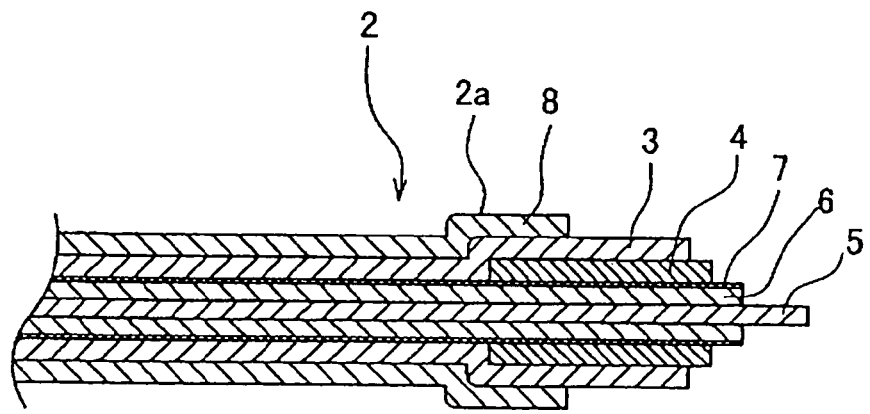
FIG. 3 A cross sectional view taken along III-III line in FIG. 1
Figure 4:
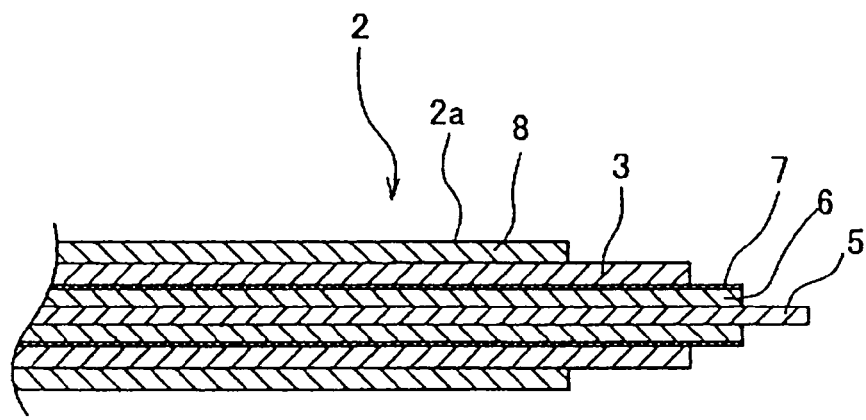
FIG. 4 A cross sectional view illustrating a state of the coaxial cable shown in FIG. 3 before insertion of the sleeve FIG. 5 A cross sectional view illustrating a state when an end part of the braid of the coaxial cable shown in FIG. 4 is hit FIG. 6 A cross sectional view illustrating a state when a central part of the braid of the coaxial cable shown in FIG. 5 is, hit FIG. 7 A cross sectional view illustrating a state when a sleeve receiving cylinder is allowed to approach the end part of the coaxial cable shown in FIG. 6

The core wire 5 is composed of one element wire or a plurality of element wires made of electrically conductive metal. The inner coating 6 is made of electrically insulating synthetic resin. The metal foil 7 is made of, for example, copper or copper alloy and formed in a thin film-shape. The braid 3 is formed in a net-shape by braiding a plurality of element wires made of electrically conductive metal with each other. The insulating sheath 8 is made of electrically insulating synthetic resin. As shown in FIG. 4, at an end part 2a of the coaxial cable 2 having a structure described above, a part of the insulating sheath 8 and a part of the inner coating 6 are removed, so that the core wire 5, inner coating 6, metal foil 7 and braid 3 are exposed. As shown in FIG. 3, at the end part 2a of the coaxial cable 2, the sleeve 4 is inserted into the inside of the braid 3 and a terminal 9 is attached to the coaxial cable 2 as shown in FIG. 1.

As shown in FIG. 1, the terminal 9 includes an inner terminal 10 made of electrically conductive metal, an electrically insulating tube 11, and a shield terminal 12 made of electrically conductive metal.

The inner terminal 10 is formed by bending a sheet metal. The inner terminal 10 caulks the core wire 5 of the coaxial cable 2 so as to be attached to the coaxial cable 5. The inner terminals 10 are connected to respective various electronic instruments.

The insulating tube 11 is made of an electrically insulating and heat-shrinkable synthetic resin and formed in a cylindrical shape. The insulating tube 11 receives the inner terminal 10 inside and is shrunk upon heating so as to come in close contact with the inner terminal 10. The insulating tube 11 electrically insulates the inner terminal 10 and the shield terminal 12 from each other.

The shield terminal 12 is formed by bending a sheet metal. The shield terminal 12 includes a body part 13 and an end cap 14. The body part 13 includes a cylindrical cap fastening part 15 and an electric wire connection part 16.

The cap fastening part 15 fits to an outer periphery of the insulating tube 11 so as to be attached to the insulating tube 11. The electric wire connection part 16 includes a bottom plate 17 continuing to the cap fastening part 15, a sleeve caulking part 18, and a sheath caulking part 19. A shape of the bottom plate 17 in plan view is rectangular. An end of the bottom plate 17 continues to the cap fastening part 15.

The sleeve caulking part 18 includes a pair of braid caulking pieces 20 rising up from an outer edge of the bottom plate 17. The pair of braid caulking pieces 20 rises up from the outer edge of the width direction of the bottom plate 17. The braid 8, into the inside of which the sleeve 4 is inserted at the end part of the coaxial cable 2, is placed on the bottom plate 17 and then, the sleeve caulking part 18 is bent in a direction in which the braid caulking pieces 20 approach the bottom plate 17. The sleeve caulking part 18 puts the braid 3, into the inside of which the sleeve 4 is inserted at the end part of the coaxial cable 2, between the braid caulking pieces 20 and the bottom plate 17 so as to caulk the braid 3, so that the sleeve caulking part 18 is electrically connected to the braid 3 situated at the end part of the coaxial cable 2. At that time, the braid caulking pieces 20 put the braid 3 between the pair of braid caulking pieces 20 and the sleeve 4.

The sheath caulking part 19 includes a pair of sheath caulking pieces 21. Each sheath caulking piece 21 rises up from a corresponding outer edge of the width direction of the bottom plate 17 and is arranged farther from the cap fastening part 15 than the corresponding braid caulking piece 20 is.

The sheath caulking part 19 is bent in a direction in which the sheath caulking pieces 21 approach the bottom plate 17. The sheath caulking part 19 puts the insulating sheath 8, which is placed on the bottom plate 17, between the pair of the sheath caulking pieces 21 and the bottom plate 17 so as to caulk the insulating sheath 8 of the coaxial cable 2.

The end cap 14 is made of an electrically conductive sheet metal and formed in a cylinder-shape having a closed end. The end cap 14 is attached to the cap fastening part 15 of the body part 13.

The cap fastening part 15 of the body part 13 is attached to the outer periphery of the insulating tube 11, then the sleeve caulking part 18 caulks the braid 3, into the inside of which the sleeve 4 is inserted and then the sheath caulking part 19 caulks the insulating sheath 8, so that the shield terminal 12 is fastened to both of the coaxial cable 2 and the insulating tube 11. The shield terminal 12 is electrically connected to the braid 3 of the coaxial cable 2 through the sleeve 4, so that the shield terminal 12 is electrically connected to a ground circuit and so on of the electronic instrument described above.

The insulating tube 11 is fit to the outer periphery of the inner terminal 10 attached to the core wire 5 of the coaxial cable 2, the cap fastening part 15 of the body part 13 of the shield terminal 12 is fit to the outer periphery of the insulating tube 11, and the end cap 14 is attached to the cap fastening part 15 of the body part 13, so that the terminal 9 is assembled. The coaxial cable 2 and the braid into the inside of which the sleeve 4 is inserted are placed on the bottom plate 17, and the caulking pieces 18 and 19 are bent toward the bottom plate 17, so that he terminal 9 caulks the braid 3 and the insulating sheath 8. Thus, the terminal 9 is attached to the end part 2a of the coaxial cable 2, thereby electrical connection to the electronic instrument described above is carried out through the terminal 9.

Figure 2:
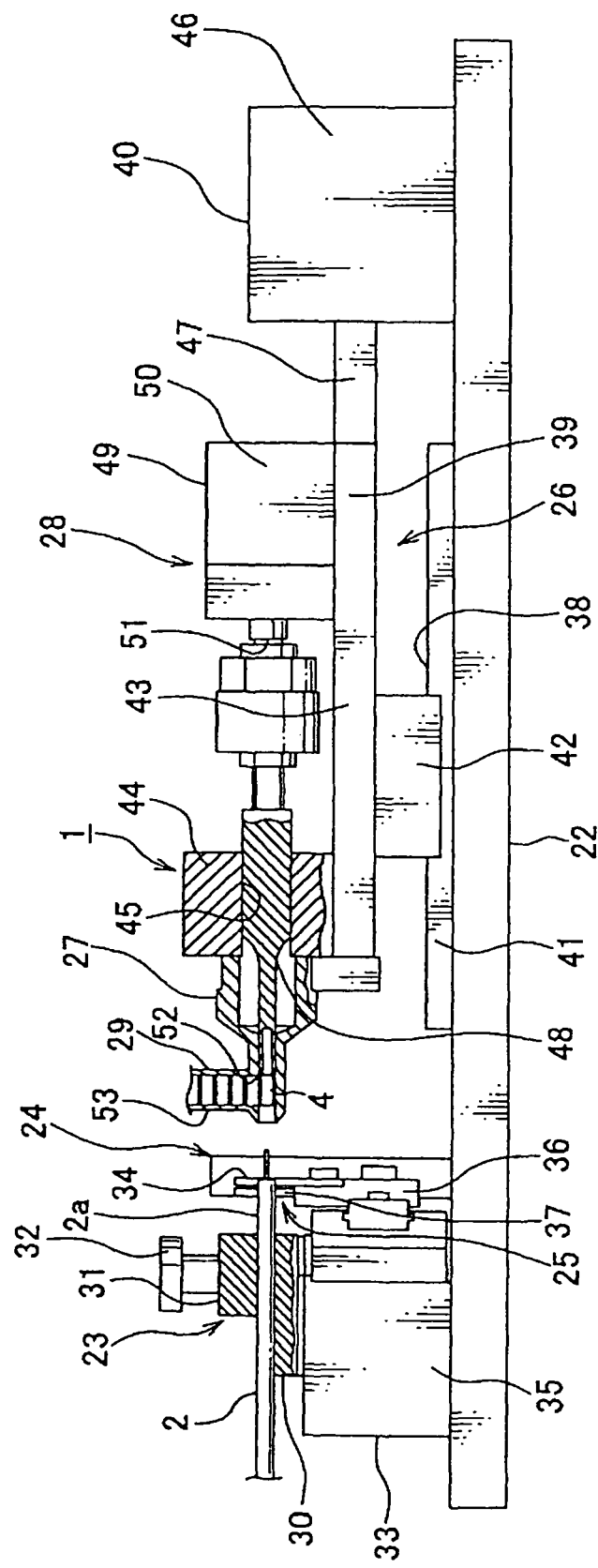

The sleeve inserting apparatus 1 inserts the sleeve 4 into the inside of the braid 3 exposed from the end part 2a of the coaxial cable 2 and the outside of the metal foil 7. An inner diameter of the sleeve 4 is approximately equal to an outer diameter of the metal foil 7. As shown in FIG. 2, the sleeve inserting apparatus 1 includes: a base 22 as an apparatus body; a cable holding part 23; a braid spreading part 24; a braid pressing part 25; a cylinder transferring part 26; sleeve receiving cylinder 27; a sleeve pushing part 28; a sleeve supplying part 29; and a control device as a control means.

The base 22 is formed in a flat plate-shape and arranged on a floor in a plant. In an example shown in the figure, the base 22 is formed in a rectangular shape.

The cable holding part 23 is provided on one end part of the base 22 in a longitudinal direction of the base 22. The cable holding part 23 is fixed on the base 22 through a cylinder body 35 of a retractable approaching-leaving cylinder (explained later) of the braid spreading part 24. The cable holding part 23 includes: a fixing member 30 fixed to the cylinder body 35; a transferring member 31 which is formed capable of approaching or leaving the fixing member 30 and puts the end part 2a of the coaxial cable 2 between the transferring member 31 and the fixing member 30; and a fastening member 32 which makes the fixing member 30 and the transferring member 31 approach and leave each other. The cable holding part 23 positions the end part 2a of the coaxial cable 2 between the fixing member 30 and the transferring member 31 and makes the transferring member 31 to approach the fixing member 30 by the fastening member 32 so as to put the end part 2a of the coaxial cable 2 between the fixing member 30 and the transferring member 31, so that the cable holding part 23 holds the end part 2a of the coaxial cable 2. The cable holding part 23 holds the end part 2a of the coaxial cable 2 on a condition that the longitudinal direction of the coaxial cable 2 is parallel to the longitudinal direction of the base 22.

The braid spreading part 24 includes a retractable (i.e. capable of retracting or protruding) approaching-leaving (i.e. capable of approaching or leaving) cylinder 33 as the braid hitting member transferring part and a pair of braid hitting members 34 (one of the pair being shown in FIG. 2). The retractable approaching-leaving cylinder 33 is provided on one end part of the base 22. The retractable approaching-leaving cylinder 33 includes: a cylinder body 35; and a pair of rods 36 which is retractable (i.e. capable of retracting or protruding) from the cylinder body 35 and capable of approaching or leaving in a direction crossing at right angles a direction of the retracting motion (i.e. retracting or protruding motion) of the pair of rods 36. The cylinder body 35 is fixed on the one end part of the base 22.

The pair of rods 36 is arranged at a position where the pair of rods 36 positions the coaxial cable 2 held by the cable holding part 23 therebetween (only one rod 36 situated at the depth side being shown in FIG. 2). The pair of rods 36 as one piece is retractable from the cylinder body 35. The direction of the retracting motion of the pair of rods 36 from the cylinder body 35 is parallel to a longitudinal direction of the coaxial cable 2 held by the cable holding part 23. Therefore, the pair of rods 36 transfers the braid hitting member 34 in the longitudinal direction of the coaxial cable 2. The pair of rods 36 approaches or leaves each other in a direction crossing at right angles the direction of the retracting motion thereof from the cylinder body 35 so as to be capable of approaching or leaving the coaxial cable 2 held by the cable holding part 23.

Each braid hitting member 34 is attached to a corresponding rod 36 of the retractable approaching-leaving cylinder 33. Therefore, the pair of the braid hitting members 34 is arranged at a position where the pair of the braid hitting members 34 positions the coaxial cable 2 held by the cable holding part 23 therebetween (only one braid hitting member 34 situated at the depth side being shown in FIG. 2). When the pair of the rods 36 of the retractable approaching-leaving cylinder 33 approaches each other, the pair of the braid hitting members 34 hits the braid 3 exposed from the end part 2a of the coaxial cable 2.

The braid spreading part 24 allows the pair of the rods 36 to approach or leave each other on a condition that the rod 36 protrudes from the cylinder body 35, and the braid hitting members 34 hit an end part of the braid 3 exposed from the end part 2a of the coaxial cable 2. Thereafter, the braid spreading part 24 allows the rod 36 to contract toward the cylinder body 35 so as to allow the pair of the rods 36 to approach or leave each other, and the pair of the braid hitting members 34 hits the braid 3 exposed from the end part 2a of the coaxial cable 2 at a portion of the braid 3 near the center of the coaxial cable 2. Therefore, the retractable approaching-leaving cylinder 33 transfers the braid hitting members 34 along the longitudinal direction of the coaxial cable 2 so that the braid hitting members 34 hit the braid 3 at a portion of the braid 3 near the center of the coaxial cable 2 after the braid hitting members 34 hit an end part of the braid 3.

The braid pressing part 25 is arranged in the proximity of the braid spreading part 24. The braid pressing part 25 includes a pair of cylinders (not shown in the figure) attached to one end part of the base 22 and a pair of braid pressing members 37. The pair of the cylinders includes a cylinder body fixed to the base 22 and a pair of rods capable of retracting or protruding from the cylinder body. The pair of the cylinders is arranged at a position where the pair of the cylinders positions the end part 2a of the coaxial cable 2 held by the cable holding part 23 therebetween. When the rods retract or protrude from the cylinder body, the rods approach or leave each other.

Each braid pressing member 37 is attached to the corresponding rod of the cylinder. Therefore, the pair of the braid pressing members 37 is arranged at a position where the pair of the braid pressing members 37 positions the coaxial cable 2 held by the cable holding part 23 therebetween (only one braid pressing member 37 situated at the depth side being shown in FIG. 2). When the rods of the cylinder approach each other, the pair of the braid pressing members 37 presses the braid 3, which is exposed from the end part 2a of the coaxial cable 2 and once spread, and into the inside of which the sleeve 4 is inserted, onto the outer circumferential surface of the sleeve 4.

The cylinder transferring part 26 includes a linear guide 38, a support table 39, and a cylinder 40. The linear guide 38 includes a rail 41 extending straight and a slider 42 supported by the rail 41 movable along a longitudinal direction of the rail 41. The rail 41 is fixed on the base 22 and a longitudinal direction of the rail 41 is parallel to the longitudinal direction of the base 22, that is, parallel to the longitudinal direction of the coaxial cable 2 held by the cable holding part 23.

The support table 39 is formed in a thick flat plate-shape and attached to the slider 42. Therefore, the support table 39 is capable of approaching or leaving the cable holding part 23 by the linear guide 38. The support table 39 includes a base part 43 fixed on the slider 42 and a rising-up part 44 rising up from an end part of the base part 43 near the cable holding part 23. The rising-up part 44 is provided with a guide hole 45 which guides a transferring direction of the sleeve receiving cylinder 27.

The guide hole 45 penetrates through the rising-up part 44. The guide hole 45 allows a pushing pipe 48 (explained later) of the sleeve pushing part 28 to pass through the inside of the guide hole 45. By allowing the pushing pipe 48 to pass through, the guide hole 45 guides the pushing pipe 48 to approach or leave the cable holding part 23, that is, to approach or leave the coaxial cable 2.

The cylinder 40 includes a cylinder body 46 fixed on an opposite end part of the base 22 and a rod 47 formed to be capable of approaching or leaving the cylinder body 46. A longitudinal direction of the rod 47 is parallel to the longitudinal direction of the base 22. The rod 47 is fixed on the support table 39.

The sleeve receiving cylinder 27 is attached to the support table 39 and the rod 47 of the cylinder 40 lengthens, so that the cylinder transferring part 26 allows the sleeve receiving cylinder 27 to approach the coaxial cable 2 held by the cable holding part 23 through the support table 39.

The sleeve receiving cylinder 27 is formed in a cylindrical shape, attached to the rising-up part 44 so that a space inside the sleeve receiving cylinder 27 communicates with the guide hole 45, and arranged facing an end part of the coaxial cable 2 held by the cable holding part 23. The sleeve receiving cylinder 27 receives one sleeve 4 thereinside. An inner diameter of the sleeve receiving cylinder 27 is approximately equal to an outer diameter of the braid 3. A cross section of an end part of the sleeve receiving cylinder 27 facing the end part of the coaxial cable 2 held by the cable holding part 23 is formed protrusively bent in the outer circumferential direction. The end part of the sleeve receiving cylinder 27 facing the end part of the coaxial cable 2 held by the cable holding part 23 is formed gradually tapered as approaching the end part of the coaxial cable 2.

The sleeve pushing part 28 includes a pushing pipe 48 and a pushing cylinder 49. The pushing pipe 48 is formed in a cylindrical shape having inner and outer diameters approximately equal to inner and outer diameters of the sleeve 4, respectively. The pushing pipe 48 is received in the guide hole 45 and the sleeve receiving cylinder 27 and supported movable in the longitudinal direction of the base 22 by the guide hole 45 and the sleeve receiving cylinder 27. The pushing pipe 48 is arranged on the side situated farther away from the cable holding part 23 than the sleeve 4 to be received in the sleeve receiving cylinder 27 is situated.

The pushing cylinder 49 includes: a cylinder body 50 fixed on an end part of the base part 43 of the support table 39, said end part being situated away from the cable holding part 23; and a rod 51 formed to be capable of retracting or protruding from the cylinder body 50. A longitudinal direction of the rod 51 is parallel to the longitudinal direction of the base 22. When the rod 51 lengthens from the cylinder body 50, the rod 51 approaches the cable holding part 23. The rod 51 is fixed to the pushing pipe 48. As for the sleeve pushing part 28 having a construction described above, when the rod 51 of the pushing cylinder 49 lengthens, the pushing pipe 48 pushes the sleeve 4 from the sleeve receiving cylinder 27 to the inside of the braid 3.

The sleeve supply part 29 is provided at a position situated away from an end of the sleeve receiving cylinder 27, said end being near the end part 2a of the coaxial cable 2, i.e. near the cable holding part 23. The sleeve supply part 29 includes: a through hole 52 penetrating through a circumferential wall of the sleeve receiving cylinder 27; a supply cylinder 53 communicating with the through hole 52; and a parts feeder (not shown in the figure). The through hole 52 allows the sleeve 4 to pass thereinside so as to guide the sleeve 4 into the sleeve receiving cylinder 27. The supply cylinder 53 receives a plurality of the sleeves 4 therein. The parts feeder, that is, the sleeve supply part 29 supplies the sleeves 4 one by one into the through hole 52 through the supply cylinder 53. The sleeve supply part 29 supplies the sleeves 4 to a position in the sleeve receiving cylinder 27, said position being situated nearer to the cable holding part 23 than the pushing pipe 48 being.

The control device is a computer including known RAM, ROM, CPU and so on. The control device is connected to the braid spreading part 24, braid pressing part 25, cylinder transferring part 26, sleeve pushing part 28, sleeve supplying part 29 and so on so that the control device controls the entire sleeve inserting apparatus 1.

The sleeve inserting apparatus 1 described above inserts the sleeve 4 into the braid 3 at the end part 2a of the coaxial cable 2 as follows: First, the cable holding part 23 holds the end part 2a of the coaxial cable 2. When the sleeve inserting apparatus 1 is driven, first, the control device contracts the rod 51 of the pushing cylinder 49 of the sleeve pushing part 28, makes the sleeve supply part 29 supply the sleeves 4 one by one into the sleeve receiving cylinder 27, contracts the rod 47 of the cylinder 40 of the cylinder transferring part 26 so as to keep the sleeve receiving cylinder 27 away from the cable holding part 23. Further, the control device keeps the rods 36 of the retractable approaching-leaving cylinder 33 of the braid spreading part 24 away from each other, that is, keeps the pair of the braid hitting members 34 away from each other, allows them to protrude from the cylinder body 35, and contracts the rod of the cylinder of the braid pressing part 25.

Figure 5:
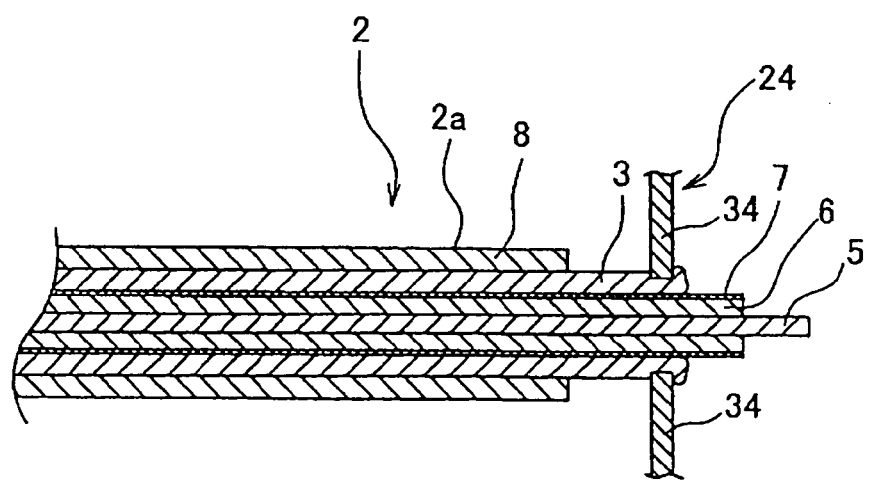
Figure 6:
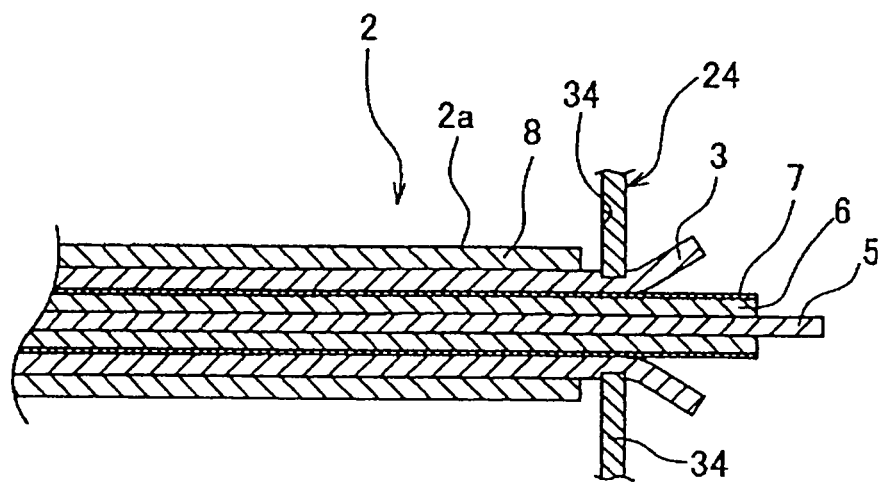

Then, as shown in FIG. 5, the control device allows the rods 36 of the retractable approaching-leaving cylinder 33 of the braid spreading part 24 to approach each other and allows the braid hitting member 34 to hit the end part of the braid 3. As a result, inner and outer diameters of the end part of the braid 3 are increased a little in a direction in which the end part of the braid 3 goes away from the metal foil 7. Thereafter, the control device allows the pair of the rods 36 of the retractable approaching-leaving cylinder 33 of the braid spreading part 24 to approach the cylinder body 35 and thereafter, as shown in FIG. 6, allows the pair of the rods 36 of the retractable approaching-leaving cylinder 33 to approach each other, makes the braid hitting members 34 hit a portion of the braid 3 near the central part of the coaxial cable 2 so as to keep the pair of the rods 36 of the retractable approaching-leaving cylinder 33 away from each other. As a result, inner and outer diameters of the end part of the braid 3 are further increased in the direction in which the end part of the braid 3 goes away from the metal foil 7.

Figure 7:
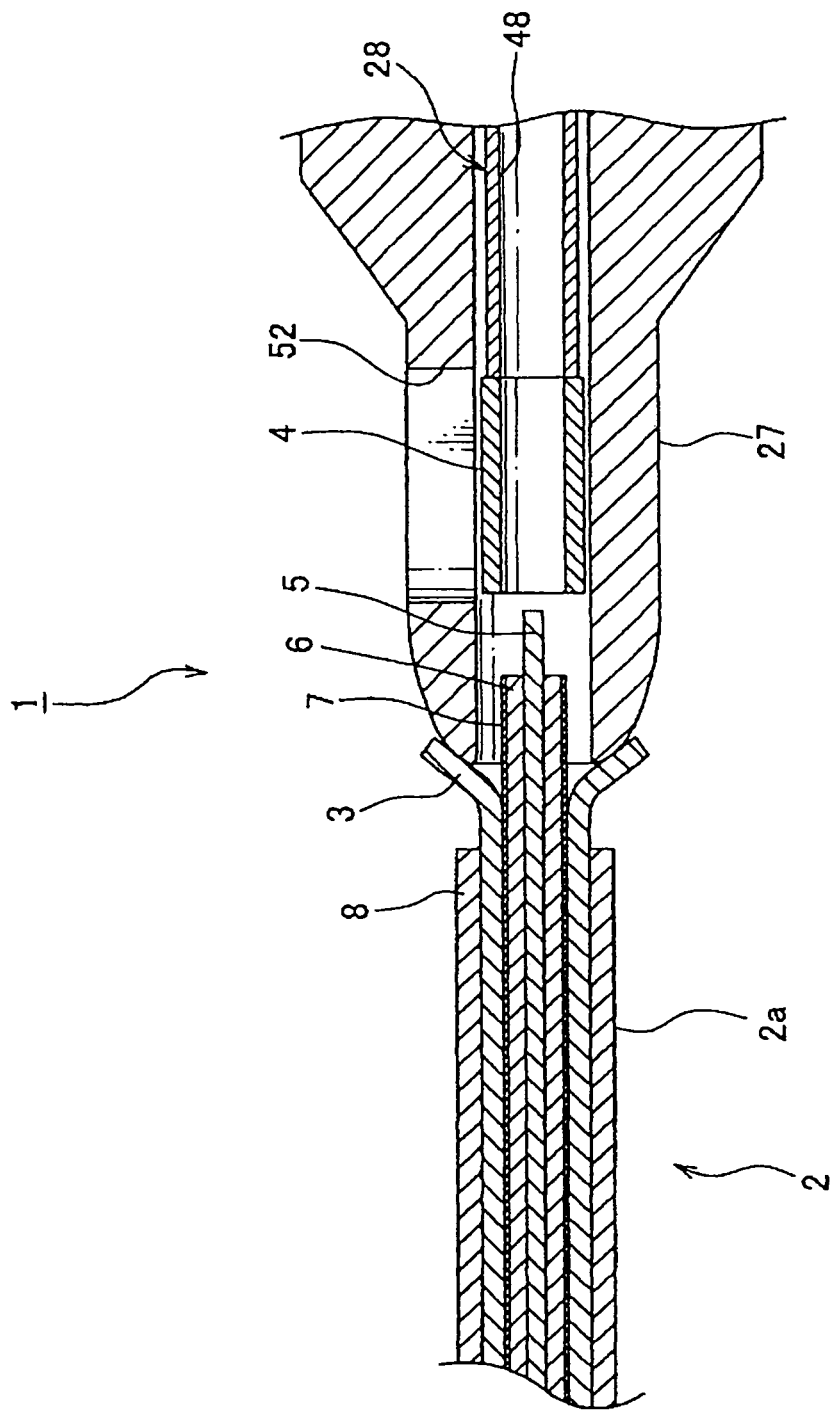
Figure 8:
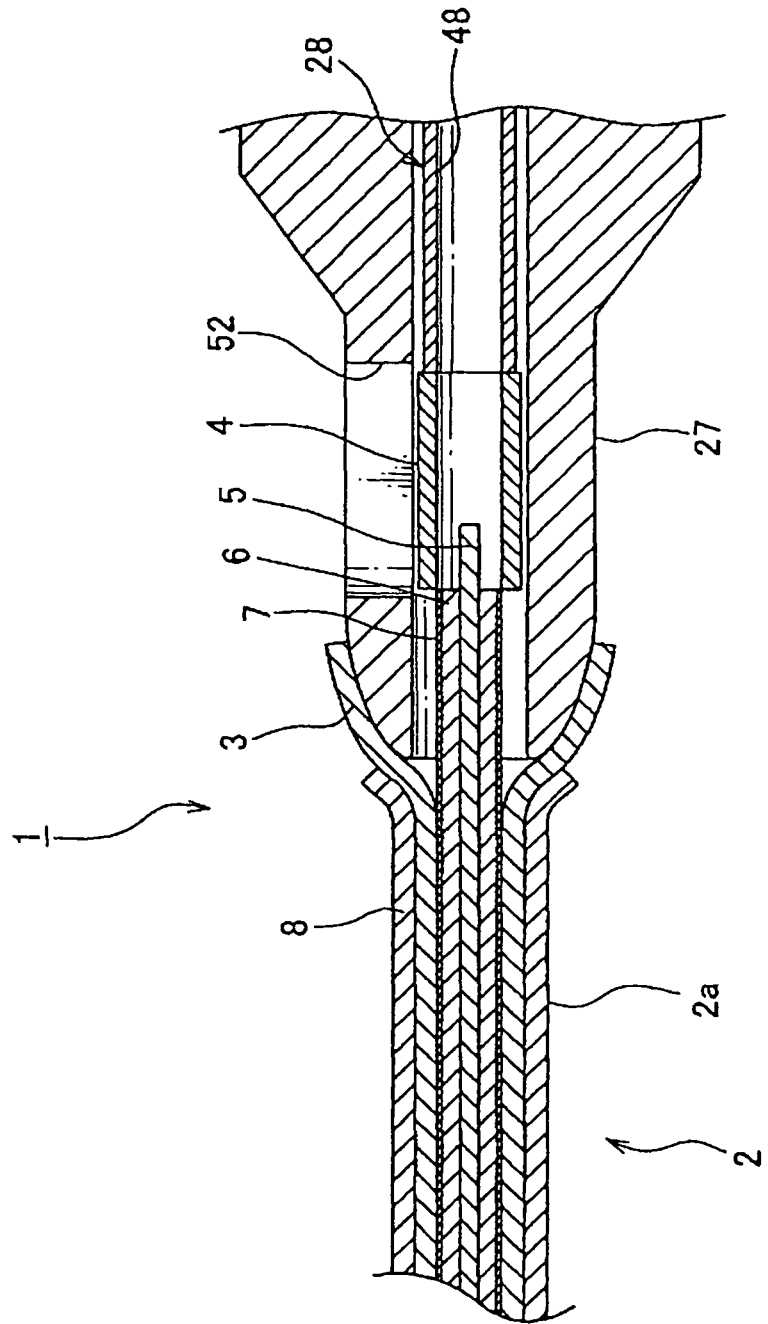
FIG. 8 A cross sectional view illustrating a state when the braid of the coaxial cable shown in FIG. 7 is spread by the sleeve receiving cylinder FIG. 9 A cross sectional view illustrating a state when a sleeve is inserted into the inside of the braid of the coaxial cable shown in FIG. 8

Thereafter, the control device lengthens the rod 47 of the cylinder 40 of the cylinder transferring part 26 from the cylinder body 46 so as to allow the sleeve receiving cylinder 27 to approach the end part of the coaxial cable 2 as shown in FIG. 7. As a result, since a cross sectional shape of the end part of the sleeve receiving cylinder 27 is formed in a curved surface protruding toward the outside, therefore the braid 3 is further spread by the end part of the coaxial cable 2. Then, as shown in FIG. 8, when the end part of the sleeve receiving cylinder 27 is positioned at an end of the insulating sheath 8, the control device halts the elongation of the rod 47 of the cylinder 40.

Figure 9:
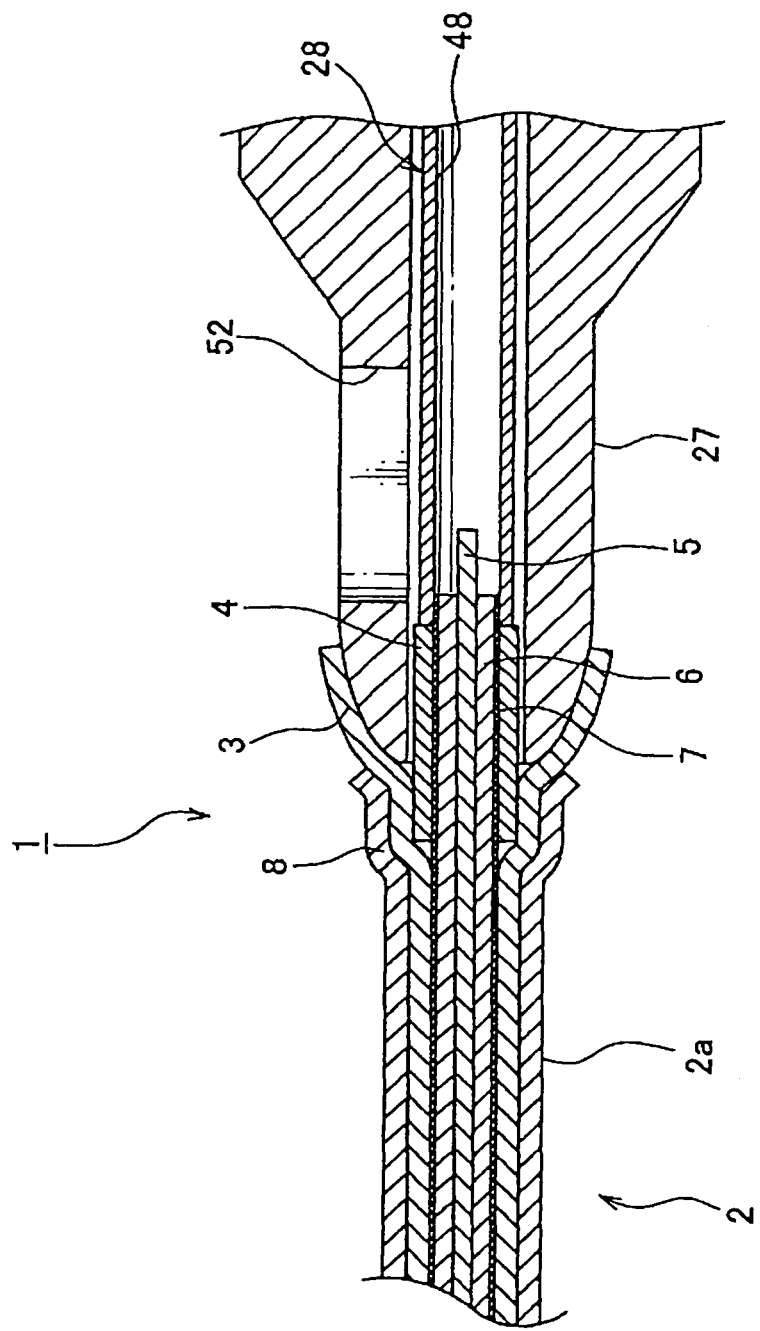

Thereafter, the control device lengthens the rod 51 of the pushing cylinder 49 of the sleeve pushing part 28, and the sleeve 4 situated within the sleeve receiving cylinder 27 is pushed to the inside of the braid 3 of the coaxial cable 2 by the pushing pipe 48 of the pushing cylinder 49. As a result, as shown in FIG. 9, the sleeve 4 enters the inside of the braid 3.

Figure 10:
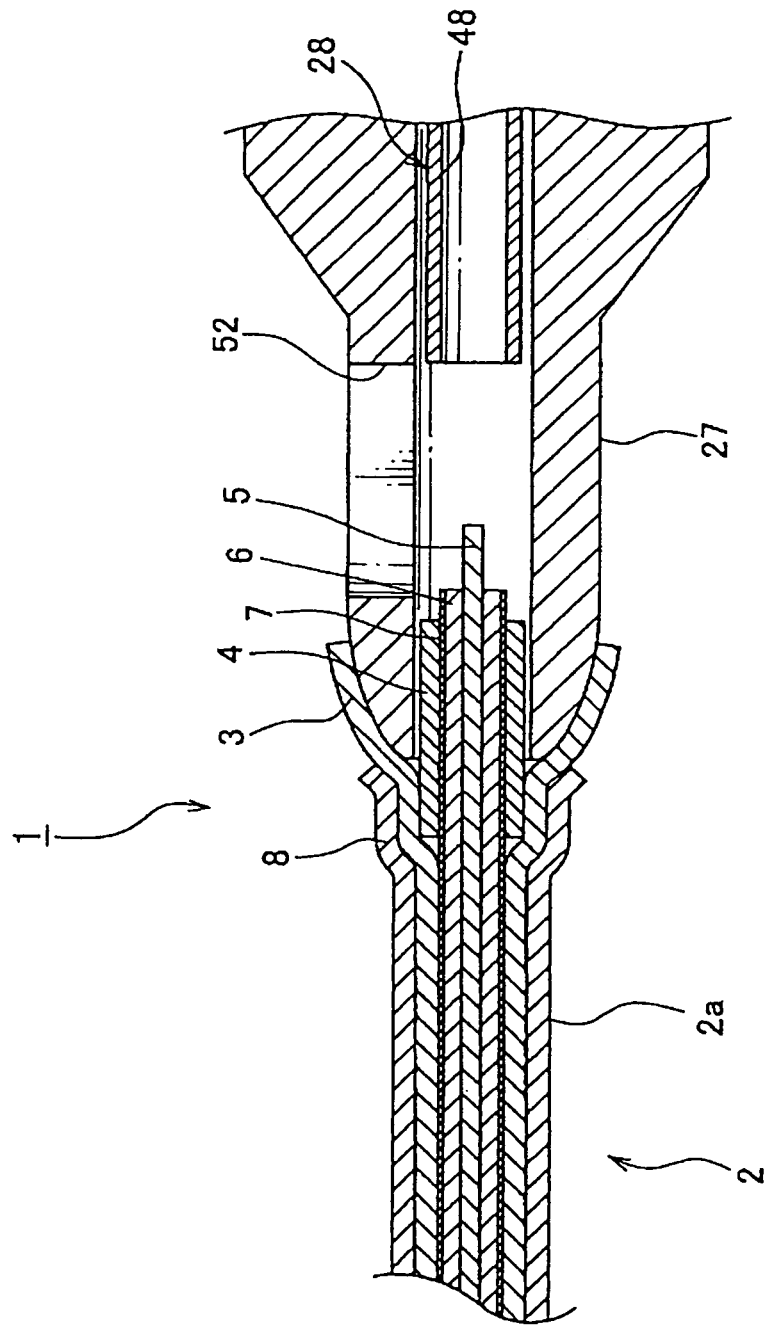
FIG. 10 A cross sectional view illustrating a state when a pushing pipe shown in FIG. 9 is positioned at a position before insertion of the sleeve FIG. 11 A cross sectional view illustrating a state when the sleeve receiving cylinder shown in FIG. 10 is parted away from an end part of the coaxial cable FIG. 12 A cross sectional view illustrating a state when the braid shown in FIG. 11 is pressed onto an outer circumferential surface of the sleeve.
Figure 11:
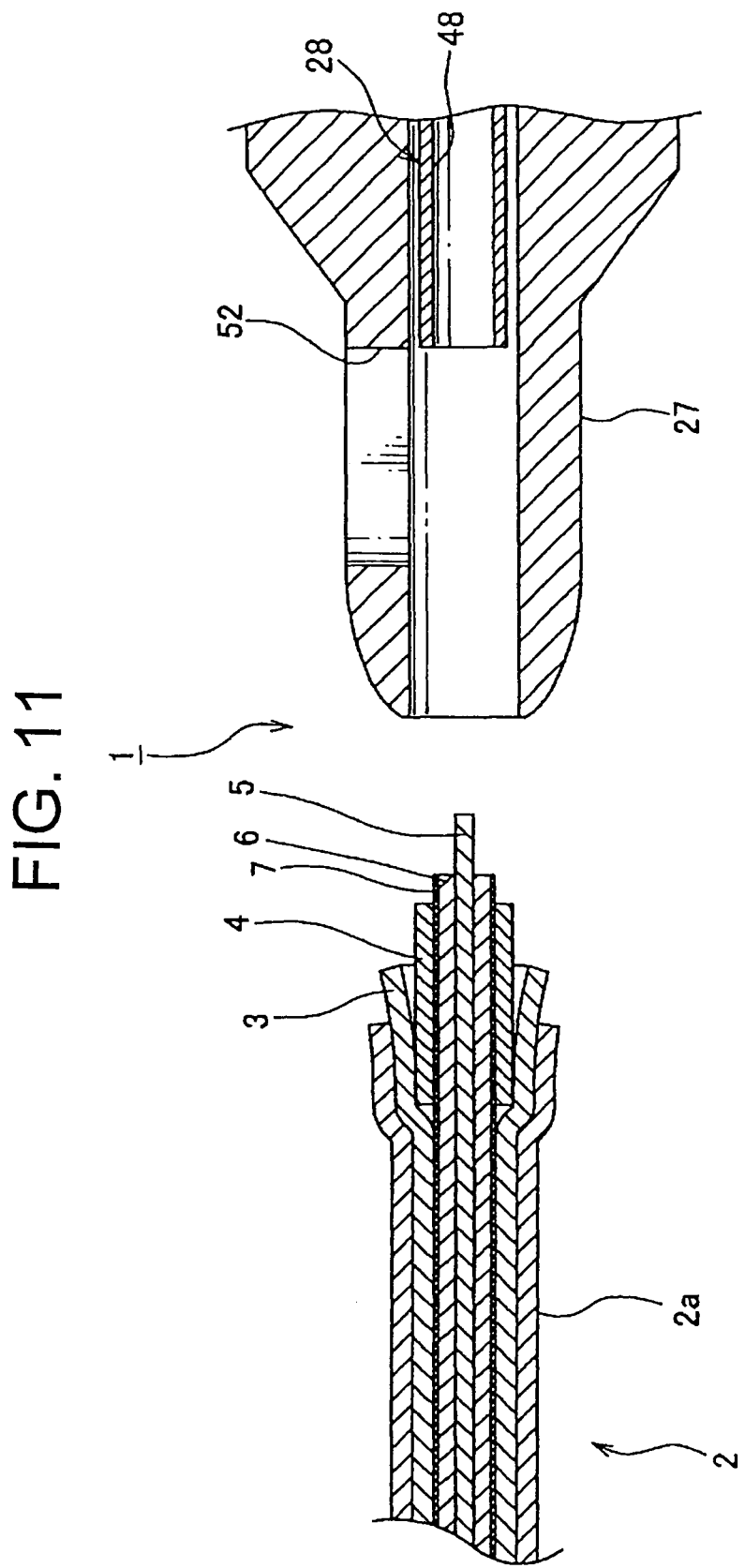
Figure 12:
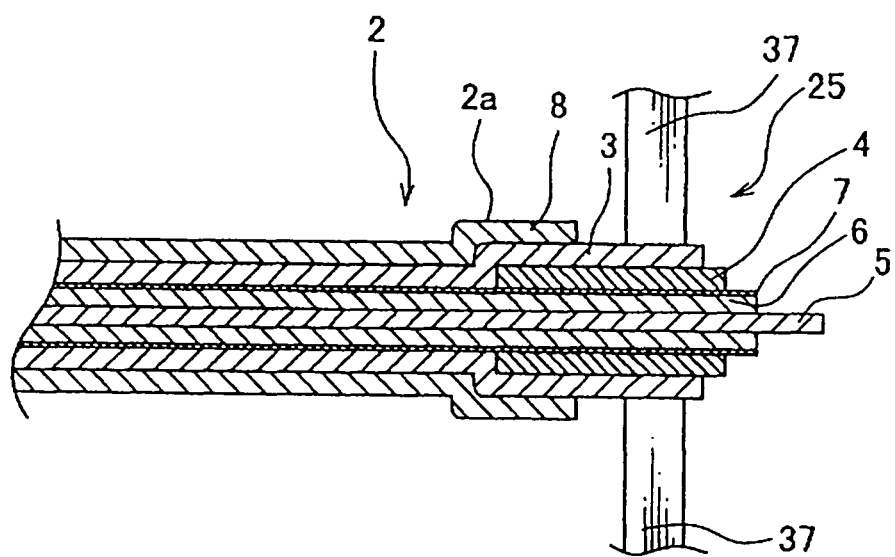

Then, as shown in FIG. 10, the control device contracts the rod 51 of the pushing cylinder 49 of the sleeve pushing part 28 so as to position the pushing pipe 48 at a position before the insertion of the sleeve 4. Thereafter, as shown in FIG. 11, the control device contracts the rod 47 of the cylinder 40 of the cylinder transferring part 26 so as to keep the sleeve receiving cylinder 27 away from the end part 2a of the coaxial cable 2. Then, the control device lengthens the rod of the cylinder of the braid pressing part 25 and as shown in FIG. 12, makes the pair of braid pressing members 37 press the braid 3 onto the outer circumferential surface of the sleeve 4. Thus, the sleeve inserting apparatus 1 inserts the sleeves 4 to the inside of the braid 3 at the end part 2a of the coaxial cable 2.

According to the preferred embodiment described above, the sleeve inserting apparatus 1 includes: the cable holding part 23 holding the end part 2a of the coaxial cable 2, the cable holding part 23 being provided on the base 22; the braid spreading part 24 spreading the braid 3; and the cylinder transferring part 26 making the tapered sleeve receiving cylinder 27 receiving the sleeve 4 approach the end part 2a of the coaxial cable 2. Therefore, by inserting the tapered sleeve receiving cylinder 27 into the braid 3 spread by the braid spreading part 24, the braid 3 spread by the braid spreading part 24 can be further spread. Since the sleeve inserting apparatus 1 has the sleeve pushing part 28 pushing the sleeve 4 situated in the sleeve receiving cylinder 27 to the inside of the braid 3, therefore the sleeve 4 can be securely inserted into the braid 3, which is spread by the braid spreading part 24 and the end part of the sleeve receiving cylinder 27. Accordingly, the sleeve 4 can be securely inserted into the inside of the braid 3 of the coaxial cable 2.

The braid spreading part 24 has the braid hitting member 34 which hits the braid 3. When the braid hitting member 34 hits the braid 3, the end part of the braid 3 is spread toward the outer circumferential side. Accordingly, the sleeve 4 can be securely inserted into the inside of the braid 3 of the coaxial cable 2.

The braid hitting member 34 hits the braid 3 in turn from the end part of the braid 3 toward the portion of the braid 3 situated at the central part of the coaxial cable 2. Therefore, whenever the braid hitting member hits the braid in turn from the end part of the braid toward the central part of the coaxial cable, the end part of the braid spread toward the outer circumferential side is further spread toward the outer circumferential side. Accordingly, the sleeve 4 can be securely inserted into the inside of the braid 3 of the coaxial cable 2.

Since the cross section of the end part of the sleeve receiving cylinder 27 is formed protrusively bent in the outer circumferential direction, therefore when the end part of the sleeve receiving cylinder 27 is allowed to approach the end part of the braid 3, the end part of the braid 3 is guided by the end part of the sleeve receiving cylinder 27, so that the braid 3 is securely spread toward the outside. Accordingly, the sleeve 4 can be securely inserted into the inside of the braid 3 of the coaxial cable 2.

Since the sleeve inserting apparatus 1 further includes the braid pressing part 25 pressing the braid 3, into the inside of which the sleeve 4 is inserted, onto the outer circumferential surface of the sleeve 4, therefore when a terminal 9 or the like is attached to the braid 3, a caulking piece 20, 21 of the terminal 9 can securely put the braid 3 between the caulking piece 20, 21 and the sleeve 4. Accordingly, the braid 3 and the terminal 9 can be securely electrically connected to each other.

Since the sleeve 4 is supplied into the sleeve receiving cylinder 27 through the through hole 52, which is provided at a position situated away from the end part of the sleeve receiving cylinder 27, therefore the sleeve 4 received in the sleeve receiving cylinder 27 is positioned in the depth compared to the end part of the sleeve receiving cylinder 27. Therefore, when the sleeve receiving cylinder 27 is pressed onto the end part 2a of the coaxial cable 2, the sleeve 4 can be prevented from interfering with the core wire 5 of the coaxial cable 2. Accordingly, the sleeve 4 can be inserted into the inside of the braid 3 of the coaxial cable 2 without damaging the core wire 5 of the coaxial cable 2.

In the preferred embodiment described above, the cylinder transferring part 26 transfers the support table 36, that is, transfers the sleeve receiving cylinder 27, so that the cable holding part 23 and the sleeve receiving cylinder 27 are allowed to approach each other, that is, the end part 2a of the coaxial cable 2 and the sleeve receiving cylinder 27 are allowed to approach each other. However, in the present invention, only the cable holding part 23 may be transferred, that is, only the end part 2a of the coaxial cable 2 may be transferred or, alternatively, both of the cable holding part 23 and the sleeve receiving cylinder 27 may be transferred, that is, both of the end part 2a of the coaxial cable 2 and the sleeve receiving cylinder 27 may be transferred.

In the preferred embodiment described above, the braid hitting member 34 of the braid spreading part 24 hits the braid 3 twice so as to spread the end part of the braid 3 in the outer circumferential direction. However, in the present invention, the braid hitting member 34 of the braid spreading part 24 may hit the braid 3 once or more than twice so as to spread the end part of the braid 3 in the outer circumferential direction. When the braid hitting member 34 of the braid spreading part 24 hits the braid 3 more than twice, the braid 3 is preferably hit in turn from the end part of the braid 3 toward the central part of the braid 3.

The aforementioned preferred embodiments are described to aid in understanding the present invention and variations may be made by one skilled in the art without departing from the spirit and scope of the present invention.

The invention claimed is:

1. A sleeve inserting apparatus, which inserts a cylindrical sleeve into the inside of a braid of a coaxial cable, comprising:
an apparatus body;
a cable holding part holding an end part of the coaxial cable, the cable holding part being provided on the apparatus body;
a braid spreading part spreading the braid exposed from the end part of the coaxial cable;
a sleeve receiving cylinder receiving the sleeve inside, an end part of the sleeve receiving cylinder facing the end part of the coaxial cable being formed tapered;
a cylinder transferring part making the sleeve receiving cylinder and the end part of the coaxial cable approach each other; and
a sleeve pushing part pushing the sleeve situated in the sleeve receiving cylinder to the inside of the braid.

2. The sleeve inserting apparatus according to claim 1, wherein the braid spreading part includes a braid hitting member hitting the braid exposed from the end part of the coaxial cable.

3. The sleeve inserting apparatus according to claim 2 further comprising a braid hitting member transferring part transferring the braid hitting member along a longitudinal direction of the coaxial cable so that the braid hitting member hits a portion of the braid near a central part of the coaxial cable after the braid hitting member hits an end part of the braid exposed from the end part of the coaxial cable.

4. The sleeve inserting apparatus as claimed in claim 3, wherein a cross section of the end part of the sleeve receiving cylinder is formed protrusively bent in an outer circumferential direction.

5. The sleeve inserting apparatus as claimed claim 4 further comprising a braid pressing part pressing the braid, which is once spread by the braid spreading part and into the inside of which the sleeve is inserted by the sleeve pushing part, onto an outer circumferential surface of the sleeve.

6. The sleeve inserting apparatus as claimed in claim 4, wherein the sleeve receiving cylinder is provided with a through hole through which the sleeve is supplied, the through hole being provided at a position situated away from an end part of the sleeve receiving cylinder near the end part of the coaxial cable.

7. The sleeve inserting apparatus as claimed claim 3 further comprising a braid pressing part pressing the braid, which is once spread by the braid spreading part and into the inside of which the sleeve is inserted by the sleeve pushing part, onto an outer circumferential surface of the sleeve.

8. The sleeve inserting apparatus as claimed in claim 3, wherein the sleeve receiving cylinder is provided with a through hole through which the sleeve is supplied, the through hole being provided at a position situated away from an end part of the sleeve receiving cylinder near the end part of the coaxial cable.

9. The sleeve inserting apparatus as claimed in claim 2, wherein a cross section of the end part of the sleeve receiving cylinder is formed protrusively bent in an outer circumferential direction.

10. The sleeve inserting apparatus as claimed claim 9 further comprising a braid pressing part pressing the braid, which is once spread by the braid spreading part and into the inside of which the sleeve is inserted by the sleeve pushing part, onto an outer circumferential surface of the sleeve.

11. The sleeve inserting apparatus as claimed in claim 9, wherein the sleeve receiving cylinder is provided with a through hole through which the sleeve is supplied, the through hole being provided at a position situated away from an end part of the sleeve receiving cylinder near the end part of the coaxial cable.

12. The sleeve inserting apparatus as claimed claim 2 further comprising a braid pressing part pressing the braid, which is once spread by the braid spreading part and into the inside of which the sleeve is inserted by the sleeve pushing part, onto an outer circumferential surface of the sleeve.

13. The sleeve inserting apparatus as claimed in claim 12, wherein the sleeve receiving cylinder is provided with a through hole through which the sleeve is supplied, the through hole being provided at a position situated away from an end part of the sleeve receiving cylinder near the end part of the coaxial cable.

14. The sleeve inserting apparatus as claimed in claim 2, wherein the sleeve receiving cylinder is provided with a through hole through which the sleeve is supplied, the through hole being provided at a position situated away from an end part of the sleeve receiving cylinder near the end part of the coaxial cable.

15. The sleeve inserting apparatus as claimed in claim 1, wherein a cross section of the end part of the sleeve receiving cylinder is formed protrusively bent in an outer circumferential direction.

16. The sleeve inserting apparatus as claimed claim 15 further comprising a braid pressing part pressing the braid, which is once spread by the braid spreading part and into the inside of which the sleeve is inserted by the sleeve pushing part, onto an outer circumferential surface of the sleeve.

17. The sleeve inserting apparatus as claimed in claim 15, wherein the sleeve receiving cylinder is provided with a through hole through which the sleeve is supplied, the through hole being provided at a position situated away from an end part of the sleeve receiving cylinder near the end part of the coaxial cable.

18. The sleeve inserting apparatus as claimed in claim 1 further comprising a braid pressing part pressing the braid, which is once spread by the braid spreading part and into the inside of which the sleeve is inserted by the sleeve pushing part, onto an outer circumferential surface of the sleeve.

19. The sleeve inserting apparatus as claimed in claim 18, wherein the sleeve receiving cylinder is provided with a through hole through which the sleeve is supplied, the through hole being provided at a position situated away from an end part of the sleeve receiving cylinder near the end part of the coaxial cable.

20. The sleeve inserting apparatus as claimed in claim 1, wherein the sleeve receiving cylinder is provided with a through hole through which the sleeve is supplied, the through hole being provided at a position situated away from an end part of the sleeve receiving cylinder near the end pan of the coaxial cable.

* * * * *